US011692120B2

(12) United States Patent
Liang et al.

(10) Patent No.: US 11,692,120 B2
(45) Date of Patent: Jul. 4, 2023

(54) DEGRADABLE POLYMERIC NANOPARTICLES AND USES THEREOF

(71) Applicant: Texas A&M University, College Station, TX (US)

(72) Inventors: Jenn-Tai Liang, College Station, TX (US); Hulli Guan, College Station, TX (US)

(73) Assignee: Texas A&M University, College Station, TX (US)

( * ) Notice: Subject to any disclaimer, the term of this patent is extended or adjusted under 35 U.S.C. 154(b) by 0 days.

(21) Appl. No.: 17/026,016

(22) Filed: Sep. 18, 2020

(65) Prior Publication Data

US 2021/0087454 A1 Mar. 25, 2021

Related U.S. Application Data

(60) Provisional application No. 62/903,361, filed on Sep. 20, 2019.

(51) Int. Cl.
*C09K 8/24* (2006.01)
*C09K 8/508* (2006.01)
*E21B 21/00* (2006.01)
*E21B 33/138* (2006.01)
*C09K 8/512* (2006.01)

(52) U.S. Cl.
CPC .............. *C09K 8/24* (2013.01); *C09K 8/5083* (2013.01); *C09K 8/512* (2013.01); *E21B 21/003* (2013.01); *E21B 33/138* (2013.01); *C09K 2208/10* (2013.01)

(58) Field of Classification Search
None
See application file for complete search history.

(56) References Cited

U.S. PATENT DOCUMENTS

| 4,561,985 | A | * | 12/1985 | Glass, Jr. | ............... | C09K 8/206 507/131 |
| 5,407,909 | A | * | 4/1995 | Goodhue, Jr. | ......... | C09K 8/516 405/263 |
| 8,343,895 | B2 | | 1/2013 | Van de Peer et al. | | |
| 9,006,151 | B2 | | 4/2015 | Amanullah et al. | | |
| 2010/0256018 | A1 | | 10/2010 | Ezell et al. | | |
| 2012/0015852 | A1 | | 1/2012 | Quintero et al. | | |

(Continued)

FOREIGN PATENT DOCUMENTS

WO 2013116920 A1 8/2013

OTHER PUBLICATIONS

Vryzas, Z. et al., Nano-Based Drilling Fluids: A Review, Energies (2017), 10:540.

(Continued)

*Primary Examiner* — Andrew Sue-Ako
(74) *Attorney, Agent, or Firm* — Benjamin Aaron Adler

(57) ABSTRACT

Provided herein are drilling muds, including water-based drilling muds. The components of the drilling muds are a degradable fluid loss additive, for example, synthetic degradable nanoparticles, a clay mineral, for example, a smectite, and a base fluid, for example, water. Also provide are methods for preventing leak-off during a drilling operation and for automatically cleaning-up filter cake after completion of a drilling process both of which utilize the drilling muds and water-based drilling muds.

12 Claims, 5 Drawing Sheets

■ Fluid loss of 5% Bentonite
▲ Fluid loss of 5% Bentonite with 0.61% nanoparticles

(56) References Cited

U.S. PATENT DOCUMENTS

2016/0376488 A1* 12/2016 Galindo .................. E21B 21/00
                                                              175/65
2017/0022408 A1*  1/2017 Zha ....................... C08F 291/00
2017/0198190 A1*  7/2017 Maxey .................... E21B 43/16
2017/0327734 A1* 11/2017 Zhou ...................... C09K 8/887
2018/0037802 A1   2/2018 Grinrod et al.

OTHER PUBLICATIONS

Rafati, R. et al., Effect of nanoparticles on the modifications of drilling fluids properties: A review of recent advances, Journal of Petroleum Science and Engineering (2018), 161:61-76.
Hoelscher, et al. Application of nanotechnology in drilling fluids (2012), SPE 157031.

* cited by examiner

DEGRADABLE POLYMERIC NANOPARTICLES AND USES THEREOF

CROSS-REFERENCE TO RELATED APPLICATIONS

This non-provisional application claims benefit of priority under 35 U.S.C. § 119(e) of provisional application U.S. Ser. No. 62/903,361, filed Sep. 20, 2019, the entirety of which is hereby incorporated by reference.

BACKGROUND OF THE INVENTION

Field of the Invention

The present invention generally relates in particular, but not exclusively, to the drilling industry and to the field of water-based drilling muds. More specifically, the present invention relates to synthetic degradable polymeric nanoparticles as a fluid-loss additive to water-based drilling muds.

Description of the Related Art

Effective fluid loss control during drilling operations and complete filter cake cleanup at the end of the drilling process are critical to the success of drilling oil and gas wells with minimal productivity damage. The current state of the art of using oxidized metal, inorganic or organic nanoparticles, natural or synthetic polymers as fluid loss additives suffer from high cost, low drilling efficiency, potential for high formation damage, and costly and time consuming efforts in filter cake cleanup at the end of the drilling process.

Minimizing the hydrocarbon productivity damage caused by the leakoff of fluid and particulates in the drilling mud into the hydrocarbon bearing formation is critical to the success of drilling operations in the oil and gas industry. Fluid loss additives are often added in the drilling muds to form filter cake on the rock face to minimize the leakoff of the fluid and particulates into the hydrocarbon bearing formation.

Effective filter cake cleanup remains a major challenge for the fluid-loss additives commonly used in the industry. If not removed at the end of the drilling process, the filter cake itself also can cause severe formation damage (1) that affects well productivity. Filter cake cleanup currently requires the use of either mechanical or chemical means after the drilling operations are completed which are costly and time consuming (2,3).

Thus, to overcome issues identified there is a need for a fluid loss additive that both forms filter cake to effectively prevent leakoff and which also can self-degrade at the end of the drilling process. In particular there is no discussion in the prior art of solving the issue of filter cake retention by using degradable polymer materials and in particular degradable polymeric nanoparticles effective for fluid loss control. The present invention solves such long-standing issues that have not been solved by the art.

SUMMARY OF THE INVENTION

The present invention is directed to a drilling mud. The drilling mud comprises a degradable fluid loss additive, a clay mineral and a base fluid.

The present invention also is directed to a water-based drilling mud. The water-based drilling mud comprises a synthetic degradable polymeric nanoparticle having a plurality of monomers crosslinked by a self degrading crosslinker, a smectite and water.

The present invention is directed further to a water-based bentonite drilling mud comprising synthetic nanoparticles, each comprising a plurality of monomers copolymerized with a self degrading crosslinker.

The present invention is directed further still to a method for preventing leak-off during a drilling operation. In the method the water-based drilling mud described herein is introduced into a well. A layer of filter cake comprising the synthetic degradable polymeric nanoparticles is formed on a rock surface in the well, thereby preventing leak off into a formation rock. The present invention is directed to a related method for preventing leak-off further comprising self-degrading hydrolytically the synthetic degradable polymeric nanoparticles in the layer into low molecular weight, short-chained polymers to cleanup the filter cake The present invention is directed further still to a method for automatically cleaning-up filter cake after completion of a drilling process. In the method the water-based bentonite drilling mud described herein is introduced into a well during the drilling process, where the synthetic nanoparticles reduce fluid loss from the filter cake formed during the drilling process and where the synthetic nanoparticles self-degrade via hydrolysis of the self-degrading crosslinkers therein after completion of the drilling process.

Other and further aspects, features, benefits, and advantages of the present invention will be apparent from the following description of the presently preferred embodiments of the invention given for the purpose of disclosure. The invention is to cover not only individual embodiments, but combinations of those embodiments as well.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be by reference to certain embodiments thereof that are described and which are illustrated in the appended drawings. These drawings form a part of the specification. It is to be noted, however, that the appended drawings illustrate preferred embodiments of the invention and therefore are not to be considered limiting in their scope.

In FIG. 1A fluid loss$_{API}$ in milliliters is measured over 30 minutes at 95° C. and 25° C. as nanoparticle concentration increases to 1.00 wt %. In FIG. 1B the percentage of reduction in fluid loss is measured over 60 minutes at 95° C. and 25° C. as nanoparticle concentration increases to 1.00 wt %.

DETAILED DESCRIPTION OF THE INVENTION

Figure 1A:
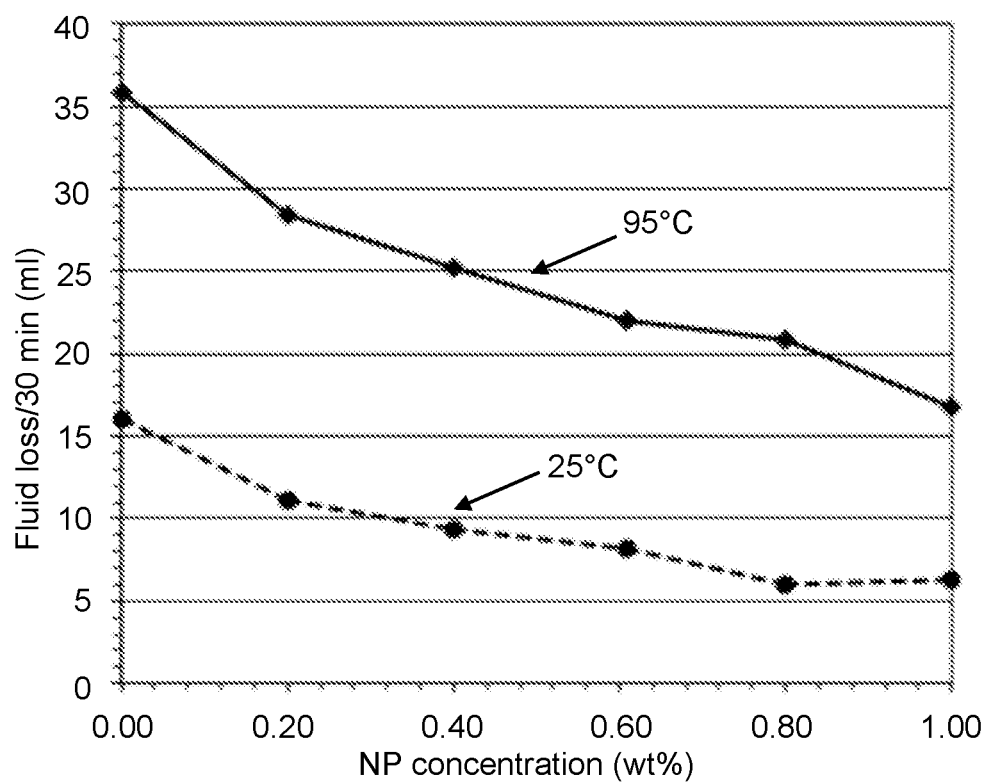
FIGS. 1A-1B illustrate how nanoparticle concentration affects fluid loss.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). For example, the recitation of about 95° C. encompasses a range of 85.5° C. to 104.5° C.

As used herein, the terms "synthetic degradable polymeric nanoparticle" and "degradable nanoparticle" and the plurals thereof are interchangeable.

In one embodiment of the present invention there is provided a drilling mud comprising a degradable fluid loss additive; a clay mineral; and a base fluid.

In this embodiment the degradable fluid loss additive may be a synthetic degradable polymeric nanoparticle. Particularly the synthetic degradable polymeric nanoparticle may comprise a plurality of monomers cross-linked by a self-degrading crosslinker. In an aspect of this embodiment the plurality of monomers comprises 2-acrylamido-2-methylpropane sulfonic acid sodium salt (AMPS) and methacrylic acid. In another aspect the self-degrading crosslinker is an acrylamide, a methacrylamide, an acrylate, or a methacrylate ester. A representative example of a self-degrading crosslinker is N,N'-methylenebis(acrylamide). Also in this embodiment the synthetic degradable polymeric nanoparticle may have a concentration of about 0.21 wt % to about 1.00 wt % in the base fluid. In addition the clay mineral may be a smectite, a kaolinite, an illite, a vermiculite, a chlorite or a combination thereof. Furthermore, the base fluid may be water.

In another embodiment of the present invention there is provided a water-based drilling mud, comprising a synthetic degradable polymeric nanoparticle having a plurality of monomers crosslinked by a self degrading crosslinker; a smectite; and water.

In this embodiment the plurality of monomers may comprise 2-acrylamido-2-methylpropane sulfonic acid sodium salt (AMPS) and methacrylic acid. Also in this embodiment the self-degrading crosslinker may be an acrylamide, a methacrylamide, an acrylate, or a methacrylate ester. A representative example of a self-degrading crosslinker is N,N'-methylenebis(acrylamide). In addition the smectite may be bentonite. Furthermore the synthetic degradable polymeric nanoparticle may have a concentration of about 0.21 wt % to about 1.00 wt % therein.

In yet another embodiment of the present invention there is provided a method for preventing leak-off during a drilling operation, comprising introducing the water-based drilling mud as described supra into a well; and forming a layer of filter cake comprising the synthetic degradable polymeric nanoparticles on a surface of a rock formation in the well, thereby preventing leak off into the rock formation. Further to this embodiment the method comprises self-degrading hydrolytically the synthetic degradable polymeric nanoparticles in the layer into low molecular weight, short-chained polymers to cleanup the filter cake.

In both embodiments the self-degrading step may be controlled by a self-degrading crosslinker comprising the synthetic degradable polymeric nanoparticle. Also in both embodiments the self-degrading step may occurs at about 95° C.

In yet another embodiment of the present invention there is provided a water-based bentonite drilling mud comprising synthetic nanoparticles, each comprising a plurality of monomers copolymerized with a self degrading crosslinker.

In this embodiment each of the synthetic nanoparticles may comprise monomers 2-acrylamido-2-methylpropane sulfonic acid sodium salt (AMPS) and methacrylic acid copolymerized with N,N'-methylenebis(acrylamide).

In yet another embodiment of the present invention there is provided a method for automatically cleaning-up filter cake after completion of a drilling process, comprising introducing the water-based bentonite drilling mud as described supra into a well during the drilling process, the synthetic nanoparticles reducing fluid loss from the filter cake formed during said drilling process and the synthetic nanoparticles self-degrading via hydrolysis of the self-degrading crosslinkers therein after completion of the drilling process.

Provided herein are drilling muds and methods to prevent leak-off or fluid loss during drilling operations. Particularly, the composition of the drilling mud provides improved filtration and rheological properties and easy cleanup. Moreover, preventing leak-off further prevents formation rock damage and facilitates an easy clean up of the filter cake formed on the rock surface. Generally, the drilling mud is water-based and comprises a degradable fluid loss additive.

More particularly, the degradable fluid loss additive may be a synthetic degradable polymeric nanoparticle which improves the performance of water-based drilling muds by providing effective leakoff control during drilling operations. When added to the drilling mud the degradable polymeric nanoparticles improve filtration properties and facilitate easy filter cake cleanup by self degrading at the end of the drilling process. The cost to manufacture the degradable polymeric nanoparticles is low and they are a cost effective alternative for the current expensive, non-degradable solid or polymeric particles as fluid loss additives.

Components of the drilling mud may be those known and standard in the art. For example, a clay mineral may comprise the drilling mud. Non-limiting examples of a drilling mud may comprise a smectite, a kaolinite, an illite, a vermiculite, or a chlorite, or a combination thereof. A representative example of a drilling mud may comprise the degradable polymeric nanoparticles and bentonite.

The degradable polymeric nanoparticle has the benefits of being both an effective fluid loss additive and self degrading to automatically breakdown the filter cake at the end of the drilling process. This is achieved through the hydrolysis of the degradable crosslinkers in the nanoparticle. The nanoparticle may be prepared by a two-step method. In the first step a cross-linked polymeric gel is synthesized by copolymerizing monomers and degradable crosslinkers in the presence of an initiator and a chain transfer agent in water. In the second step the nanoparticles are formed from the cross-linked polymeric gel via the application of high shear rates as is known and standard in the art. The final particle size can be controlled by varying the shear rate and shear time. The delay in filter cake breakdown is controlled by using different degradable crosslinkers.

The synthetic degradable polymeric nanoparticles when formed as filter cake on the rock subsequently self-degrade via hydrolysis into low molecular weight short chain polymers for easy cleanup. The degradable crosslinker comprising the gel determines the rate of hydrolysis of the polymer and, thus, the delay in filter cake breakdown. The concentration of the synthetic degradable polymeric nanoparticles in the drilling mud correlates to the desired filtration and rheological properties. A change in the desired filtration and rheological properties is achieved by adjusting the concentration of the degradable nanoparticles in the mud.

Crosslinkers with a slow rate of degradation at high or elevated temperatures, for example, about 95° C., are utilized for high temperature applications to delay the filter cake breakdown until the completion of the drilling operations. Representative crosslinkers in this class include, but are not limited to, acrylamide or methacrylamide compounds, for example, methylene bisacrylamide. For lower temperature applications, i.e. lower than about 95° C., crosslinkers able to degrade at lower temperature are utilized. Representative crosslinkers in this class include, but are not limited to, acrylate or methacrylate ester compounds, for example, polyethylene glycol (PEG) 200-1000 diacrylate.

The following examples are given for the purpose of illustrating various embodiments of the invention and are not meant to limit the present invention in any fashion.

Example 1

Methods and Materials
Preparation of Degradable Polymeric Nanoparticles as a Fluid Loss Additive of Water-Based Drilling Mud

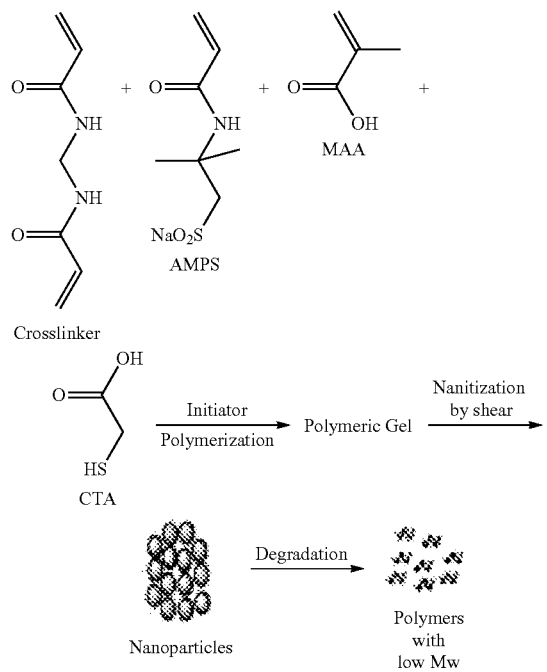

Figure 5:
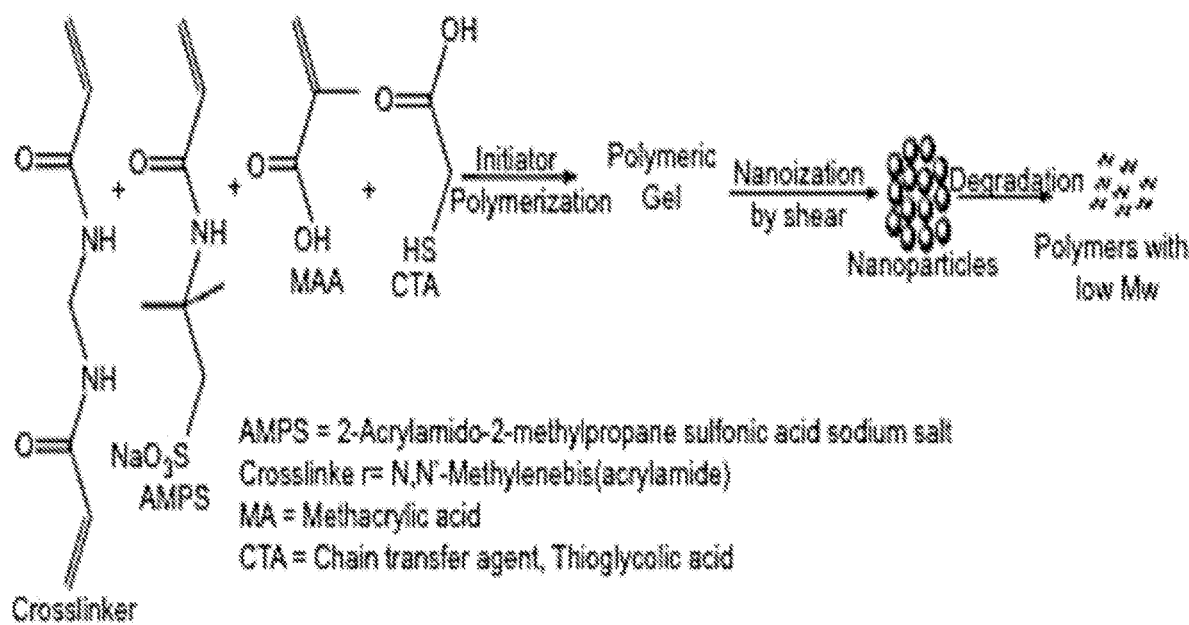
FIG. 5 is a synthetic scheme illustrating the preparation of the degradable polymeric nanoparticles.

AMPS = 2-Acrylimido-2-methylpropane sulfonic acid sodium salt
Crosslinker = N,N'-Methylenebis(acrylamide)
MA = Methacrylic acid
CTA = Chain transfer agent, Thioglycolic acid As shown in FIG. 5, the monomers 2-acrylamido-2-methylpropane sulfonic acid sodium salt (AMPS) and methacrylic acid and the crosslinker N,N'-methylenebis(acrylamide) are copolymerized in water in the presence of the chain transfer agent thioglycolic acid and the initiator VAZO 56 to produce the polymeric gel. The chain transfer agent (CTA) controls the polymer molecular weight. The polymeric gel is subjected to shear to produce the nanoparticles. The nanoparticles degrade to short polymer chains while exposed at a high temperature of 95° C. due to the use of the CTA to control polymer molecular during polymerization. Table 1 identifies the components and amounts in the synthetic scheme.

TABLE 1

| Components | Amount, g |
| --- | --- |
| AMPS, 50% | 40.11 |
| Methacrylic acid | 23.43 |
| N,N'-methylenebis(acrylamide) | 3.62 |
| thioglycolic acid (CTA) | 1.45 |
| VAZO 56 (Initiator) | 1.68 |
| 10% NaOH | 26.49 |
| Water | 134.67 |

Preparation of Drilling Mud
Drilling mud is prepared by an OFITE's Model 20 Constant Speed Blender according to API requirement (Recommended practice API 3B-1, 2017).
Preparation of Drilling Mud for General Study:
459.27 g of RO water, 14.05 g of polymeric gel and 25.00 g of bentonite are added into a blending cup. Blending is carried out at 10000 rpm for 10 minutes according to API requirement. 10% NaOH is added to adjust pH to 9.5~9.8 while stirring. In the prepared drilling mud [Bentonite]=5.00% and [nanoparticle]=0~1.00%.
Preparation of Drilling Mud for the Nanoparticle Degradation Study:
43.14 g of polymeric gel in 257.26 g of water is blended at 10000 rpm for 10 minutes to obtain nanoparticles. Nanoparticles are incubated in a flask at 95° C. while stirring. Bentonite and nanoparticles with incubated in water for 10 days, 20 days and 30 days are blended at 10000 rpm for 10 minutes. In the prepared drilling mud [Bentonite]=5.00% and [nanoparticle]=0.61%.
Preparation of Drilling Mud for Ageing Study (API 3B-1, 2017):
Polymeric gel and bentonite in water are blended at 10000 rpm for 10 minutes. The resultant drilling mud is aged in a flask in a 95° C. or a 120° C. oil bath while stirring for 24 hours. In the prepared drilling mud [Bentonite]=5.00% and [nanoparticle]=0.61%.
Measurement of Rheological Properties of Drilling Mud
Rheological properties of drilling muds are measured by an OFITE's Model 900 Viscometer at room temperature, according to the API standard Recommended Practice API 3B-1, 2017.
Measurement of Fluid Loss of Drilling Mud
Fluid loss is measured by OFITE's HTHP Filter Press equipment with OFITE filter paper, according to the API standard Recommended Practice API 3B-1, 2017. In each experiment, about 500 mL drilling fluid is prepared. Pressure of the OFITE Press cell is provided by a nitrogen (N2) gas charger. The cell and fluid collector pressures at experiments performed at different temperatures are summarized in Table 2. For each experiment, the fluid loss was collected and recorded at 0.5, 1.0, 5.0, 7.5, 15 and 30 minutes.

TABLE 2

| Testing temperature, ° C. | Cell pressure, psi | Collector pressure, psi |
| --- | --- | --- |
| 25 | 100 | 0 |
| 65 | 500 | 0 |
| 95 | 500 | 0 |
| 120 | 600 | 100 |

Measurement of Nanoparticle Size and Zeta Potential
Measurement of nanoparticle size and Zeta potential is performed by a NanoBrook Omni Nanoanalyzer. Nanoparticles are prepared in RO water by blending polymeric gel at 10000 rpm for 10 minutes. Samples are prepared by diluting 1-3 drops of the nanoparticle solution in a cuvette to approximately 4 mL with RO water or 2% NaCl. Size measurements are taken at a scattering angle of 90° C. and a temperature of 25° C. Samples for Zeta potential measurements are prepared by diluting 1 drop of nanoparticles in a cuvette with 1.25 mL of 1 mM KCl or 2% NaCl. Zeta potential is measured using the phase analysis light scattering (PALS) technique.

Example 2

Results
Effect of Salinity on Particle Size and Zeta Potential

As shown in Table 1, the size of the nanoparticles (NP) was smaller in 2% NaCl than in RO water due to the shielding effect of the sodium ions. The Zeta potential was much smaller in higher salt concentrations (2% NaCl vs. 1 mM KCl). The effect of salinity on size and Zeta potential of nanoparticles is shown in Table 3.

TABLE 3

| Nanoparticle size nm in different medium | 1381 nm in RO water 814 nm in 2% NaCl |
|---|---|
| Zeta potential in different medium | −43 mV in 1 mM KCl −24 mV in 2% NaCl |

The Effect of Nanoparticle Concentration on Fluid Loss

Figure 1B:
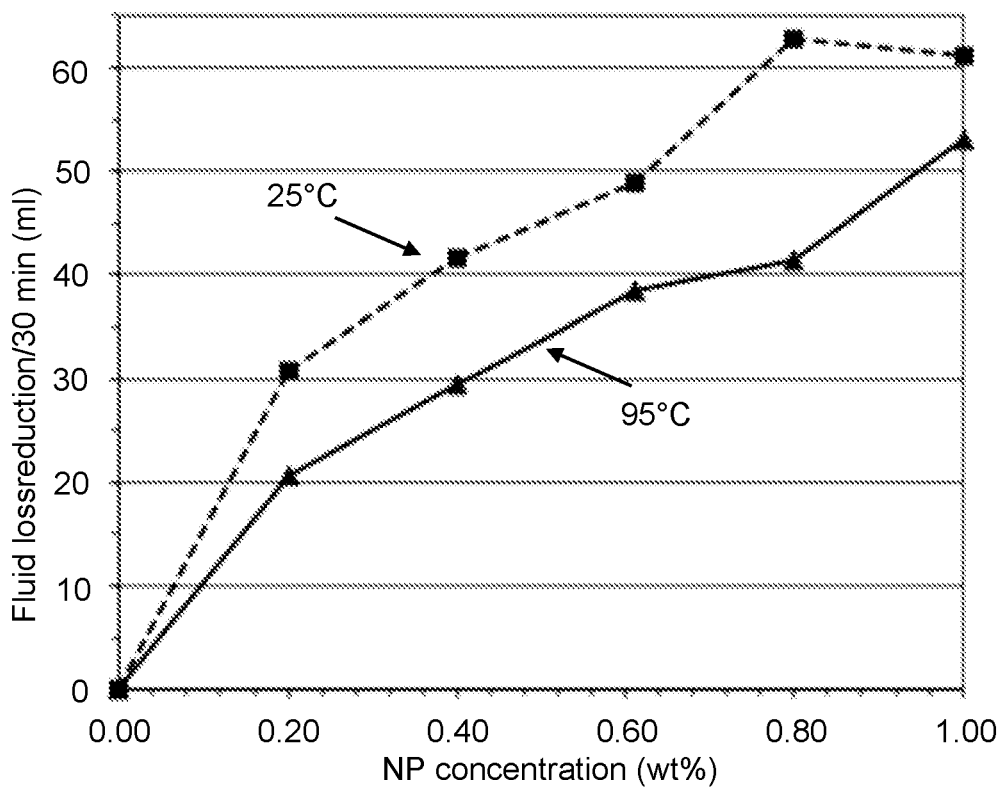

The addition of nanoparticles significantly improved the filtration property of drilling mud. Fluid loss$_{API}$ decreased with increasing NP concentration (FIG. 1A). Comparing with no NP added, increasing NP concentration from 0.2-1.0 wt % resulted in fluid loss reduction from 30% to 60% at 25° C. and from 20% to 50% at 95° C., respectively (FIG. 1B).

The Effect of Temperature on Fluid Loss

Figure 2:
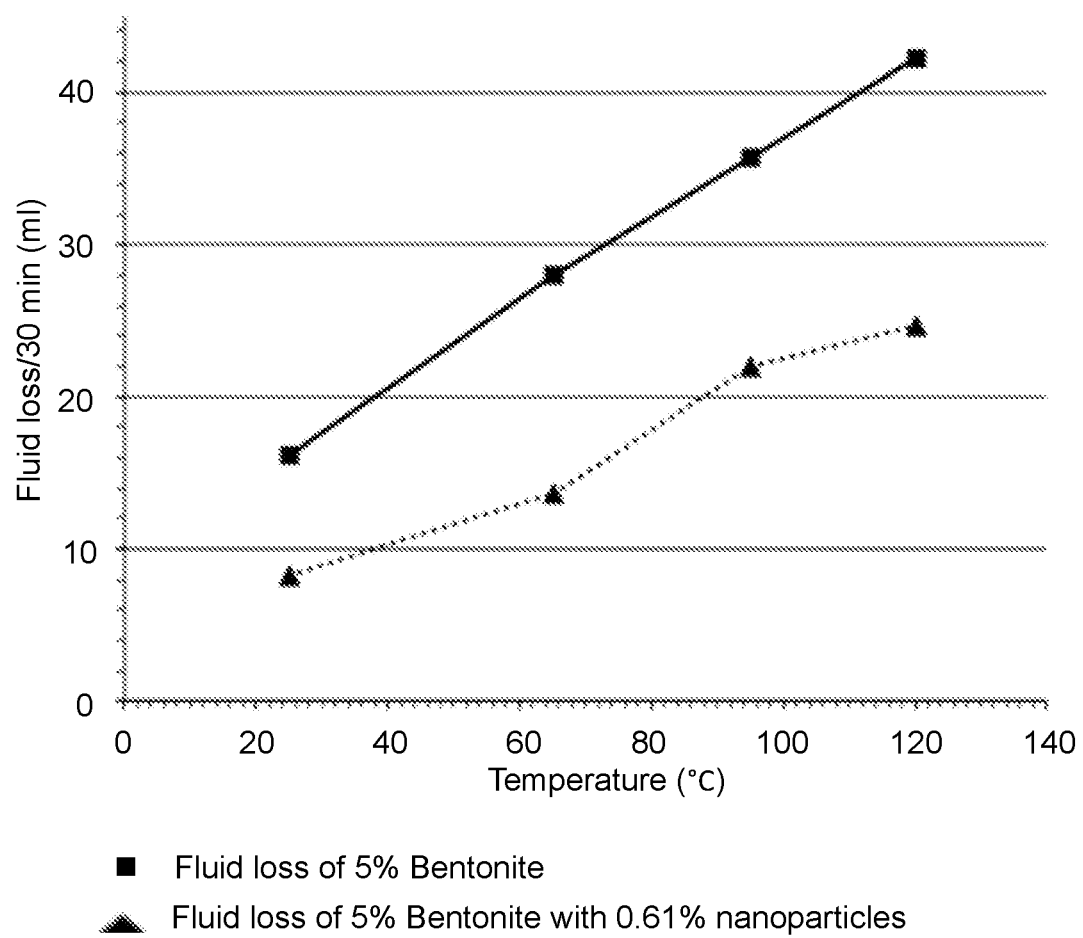
FIG. 2 illustrates how increasing temperatures from 0° C. to 120° C. affect fluid loss over 30 minutes of 5% bentonite alone and in the presence of 0.61% nanoparticles.

The addition of 0.61% NP to bentonite mud significantly improved its filtration property with improvement observed over a temperature range from 25 to 120° C. (FIG. 2).

The Effect of Nanoparticle Concentration on Rheological Properties at Ambient Temperature The nanoparticle concentration and rheological properties at ambient temperature are shown in Table 4. The addition of nanoparticles has no significant impact on the rheological properties of drilling mud except at high nanoparticular concentration of 1%.

TABLE 4

| Drilling mud | Plastic Viscosity (cP) | Yield Point (lb/100 ft$^2$) | 10 s Gel (lb/100 ft$^2$) | 10 m Gel (lb/100 ft$^2$) |
|---|---|---|---|---|
| 5.00% Bentonite | 10.98 | 12.61 | 4.80 | 12.53 |
| 5.00% Bentonite, 0.20% NP | 12.25 | 9.06 | 2.09 | 7.73 |

TABLE 4-continued

| Drilling mud | Plastic Viscosity (cP) | Yield Point (lb/100 ft$^2$) | 10 s Gel (lb/100 ft$^2$) | 10 m Gel (lb/100 ft$^2$) |
|---|---|---|---|---|
| 5.00% Bentonite, 0.40% NP | 14.38 | 10.98 | 3.13 | 11.28 |
| 5.00% Bentonite, 0.61% NP | 21.35 | 24.65 | 8.98 | 22.56 |
| 5.00% Bentonite, 0.80% NP | 26.89 | 28.01 | 8.77 | 22.77 |
| 5.00% Bentonite, 1.00% NP | 50.91 | 67.00 | 24.02 | 47.41 |

The nanoparticle concentration and rheological properties at various temperatures are shown in Table 5. There is no significant impact on rheological properties observed at temperatures ranging from 25° C. to 80° C. by adding 0.61% nanoparticles.

TABLE 5

| 5.00% Bentonite Drilling Mud | Measurement temperature, ° C. | Plastic Viscosity (cP) | Yield Point (lb/100 ft$^2$) | 10 s Gel (lb/100 ft$^2$) | 10 m Gel (lb/100 ft$^2$) |
|---|---|---|---|---|---|
| Without NP | 25 | 10.98 | 12.61 | 4.80 | 12.53 |
| Without NP | 50 | 9.10 | 13.54 | 6.68 | 16.71 |
| Without NP | 80 | 4.94 | 16.58 | 9.40 | 19.63 |
| with 0.61% NP | 25 | 21.35 | 24.65 | 8.98 | 22.56 |
| with 0.61% NP | 50 | 18.82 | 21.90 | 7.31 | 23.18 |
| with 0.61% NP | 80 | 16.21 | 17.27 | 6.47 | 22.14 |

Effect of NaCl on Filtration and Rheological Properties

Figure 3:
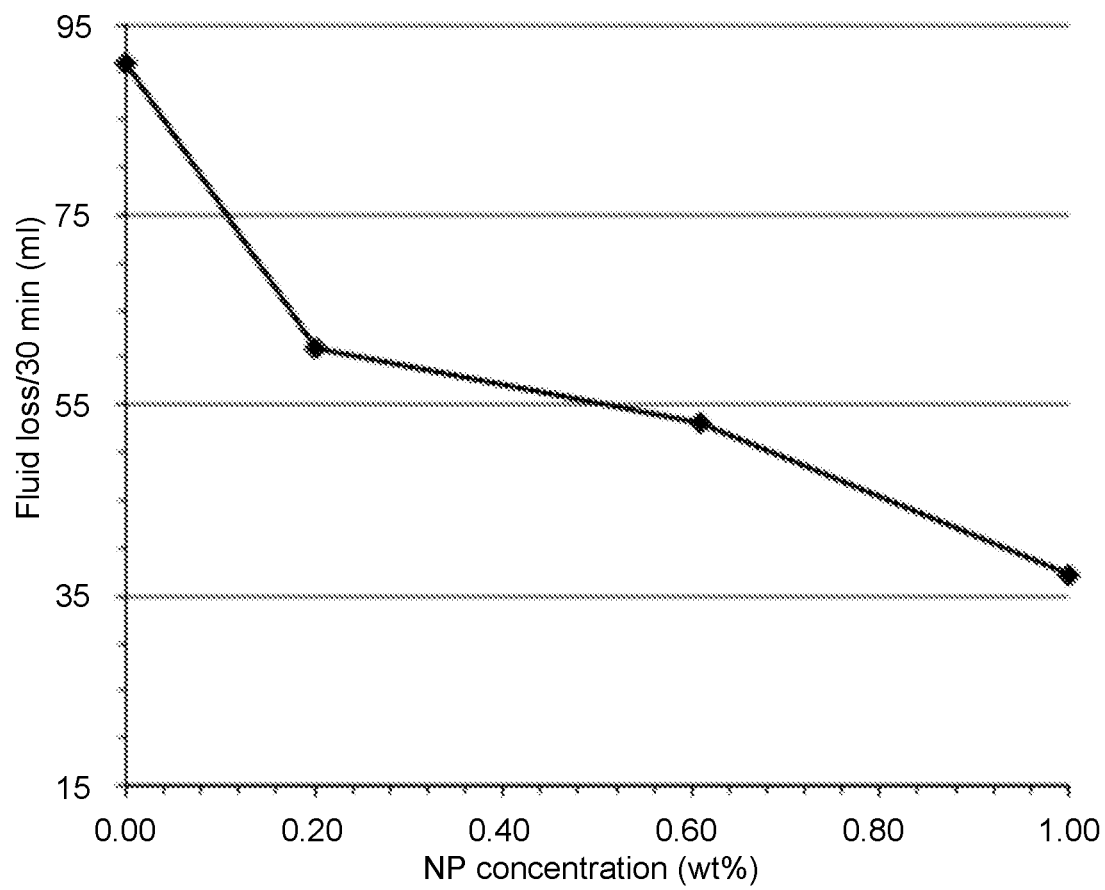
FIG. 3 illustrates how increasing nanoparticle concentration in 2% NaCl from 0 to 1.00 wt % in 5% bentonite affects fluid loss over 30 minutes at 95° C.

The addition of nanoparticles significantly improved filtration properties (fluid loss) in 2% NaCl at 95° C. (FIG. 3). The nanoparticle concentration and rheological properties at 25° C. are shown in Table 6. The addition of nanoparticles at different concentrations at 25° C. had little effect on the rheological properties.

TABLE 6

| 5% Bentonite with different concentrations of NP, % | Rheological properties at 25° C. | | | |
|---|---|---|---|---|
| | Plastic Viscosity (cP) | Yield Point (lb/100 ft$^2$) | 10 s Gel (lb/100 ft$^2$) | 10 m Gel (lb/100 ft$^2$) |
| 0 | 3.27 | 7.33 | 5.64 | 7.73 |
| 0.20 | 3.91 | 5.60 | 4.39 | 7.10 |
| 0.60 | 5.06 | 4.04 | 2.51 | 5.22 |
| 1.00 | 7.087 | 4.81 | 4.39 | 8.77 |

Self Degradation of Nanoparticles into Low Molecular Polymer for Easy Cleanup

Figure 4:
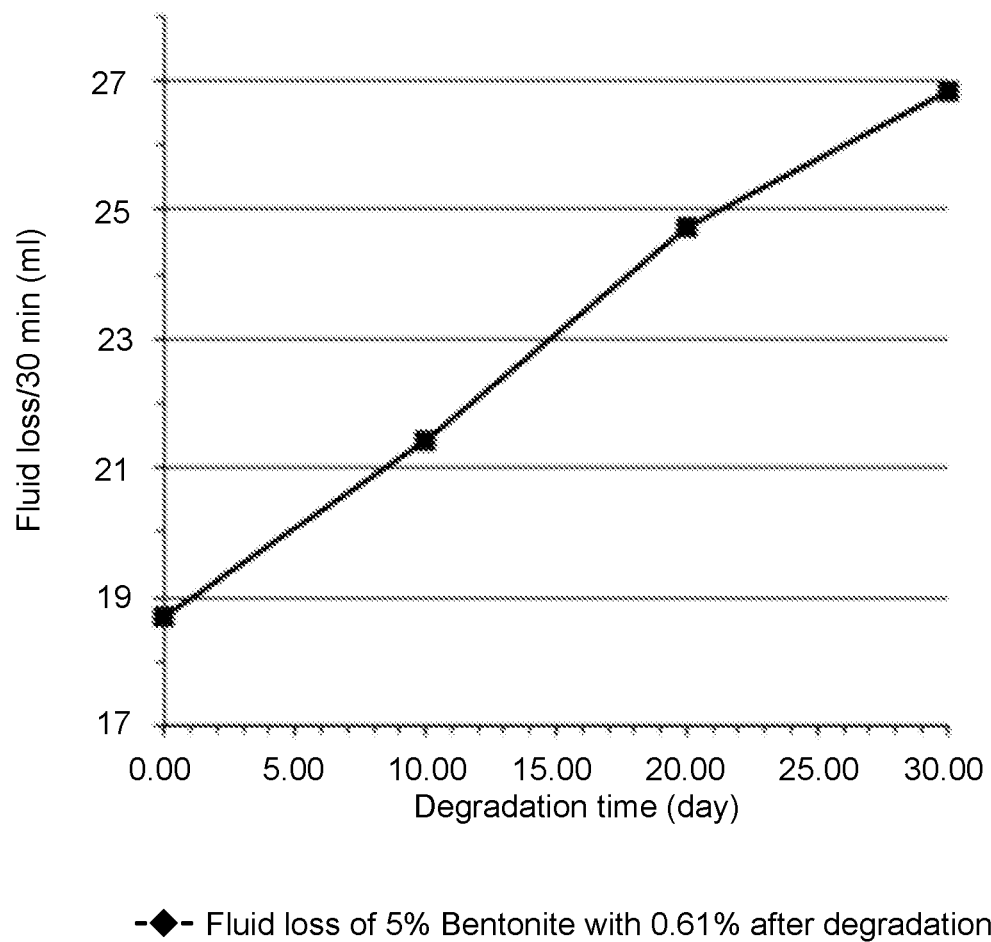
FIG. 4 illustrates the self degradation of 0.61% nanoparticles in 5% bentonite over 30 days.

FIG. 4 shows that fluid loss returns to levels without nanoparticles after incubating 30 days at 95° C. indicating that the nanoparticles self degrade into linear, short chain polymer. Nanoparticle self degradation over a 30 day period is shown in Table 7. Nanoparticle self degradation can facilitate easy cleanup with minimal formation damage after drilling operations.

TABLE 7

| Incubation time (day) at 95° C. | Fluid Loss$_{API}$ at 95° C. | Plastic Viscosity (cP) | Yield Point (lb/100 ft$^2$) | 10 s Gel (lb/100 ft$^2$) | 10 m Gel (lb/100 ft$^2$) |
|---|---|---|---|---|---|
| 0 | 18.70 | 24.84 | 26.61 | 6.89 | 20.89 |
| 10 | 21.42 | 9.83 | 6.95 | 1.67 | 3.13 |
| 20 | 24.74 | 9.01 | 5.80 | 1.46 | 3.55 |
| 30 | 26.84 | 8.24 | 4.46 | 1.04 | 2.30 |
| *Linear PMMA-AA | 27.64 | 6.15 | 1.49 | 0.42 | 1.46 |

The following references are cited herein.
1. Audibert et al. "Role of Polymers on Formation Damage", SPE 54767, 1999.
2. Nasr-EI-Din et al. An Effective Fluid Formulation to Remove Drilling-Fluid Mudcacke in Horizontal and Multilateral Wells, March 2007 SPE Drilling & Completion,
3. Cole et al., A New Environmentally Safe Crosslinked Polymer for Fluid-Loss Control, SPE 29525, 1995.

What is claimed is:

1. A drilling mud consisting of:
    a degradable fluid loss additive consisting of:
        a plurality of synthetic self-degradable polymeric nanoparticles consisting of a plurality of monomers that are 2-acrylamido-2-methylpropane sulfonic acid sodium salt and methacrylic acid and a crosslinker that is acrylamide, a methacrylamide, an acrylate, or a methacrylate ester, or a combination thereof copolymerized to said monomers with a chain transfer agent, said plurality of synthetic self-degradable polymeric nanoparticles hydrolytically self-degradable into lower molecular weight, shorter-chained polymers over a temperature-dependent period of time;
    a clay mineral; and
    water.

2. The drilling mud of claim 1, wherein the synthetic self-degradable polymeric nanoparticle has a concentration of about 0.21 wt % to about 1.00 wt % in the water.

3. The drilling mud of claim 1, wherein the clay mineral is a smectite, a kaolinite, an illite, a vermiculite, a chlorite or a combination thereof.

4. A water-based drilling mud, consisting of:
    synthetic self-degradable polymeric nanoparticles each consisting of monomers 2-acrylamido-2-methylpropane sulfonic acid sodium salt and methacrylic acid crosslinked with an acrylamide, a methacrylamide, an acrylate, or a methacrylate ester crosslinker via a chain transfer agent, said plurality of synthetic self-degradable polymeric nanoparticles hydrolytically self-degradable into lower molecular weight, shorter-chained polymers over a temperature-dependent period of time;
    a smectite; and
    water.

5. The water-based drilling mud of claim 4, wherein the smectite is bentonite.

6. The water-based drilling mud of claim 4, wherein the synthetic self-degradable polymeric nanoparticle has a concentration of about 0.21 wt % to about 1.00 wt % therein.

7. A method for preventing leak-off during a drilling operation, comprising:
    introducing the water-based drilling mud of claim 4 into a well; and
    forming a layer of filter cake comprising the synthetic self-degradable polymeric nanoparticles on a surface of a rock formation in the well, thereby preventing leak off into the rock formation.

8. The method of claim 7, further comprising self-degrading hydrolytically the synthetic self-degradable polymeric nanoparticles in the layer into lower molecular weight, shorter-chained polymers to cleanup the filter cake.

9. The method of claim 8, wherein the self-degrading step occurs at about 95° C.

10. A water-based bentonite drilling mud consisting of synthetic self-degradable nanoparticles, each consisting of 2-acrylamido-2-methylpropane sulfonic acid sodium salt monomers and methacrylic acid monomers copolymerized via a chain transfer agent with a methacrylamide crosslinker, said plurality of synthetic self-degradable polymeric nanoparticles hydrolytically self-degradable into lower molecular weight, shorter-chained polymers over a temperature-dependent period of time.

11. The water-based bentonite drilling mud of claim 10, wherein the methacrylamide crosslinker is N,N'-methylenebis(acrylamide).

12. A method for automatically cleaning-up filter cake after completion of a drilling process, comprising:
    introducing the water-based bentonite drilling mud of claim 10 into a well during the drilling process, said synthetic self-degradable nanoparticles reducing fluid loss from the filter cake formed during said drilling process and said synthetic self-degradable nanoparticles self-degrading via hydrolysis of the crosslinkers therein after completion of the drilling process.

* * * * *